(12) United States Patent
Edlinger

(10) Patent No.: US 6,261,339 B1
(45) Date of Patent: Jul. 17, 2001

(54) METHOD FOR DESILICONIZING PIG IRON BEFORE REFINING IT TO STEEL

(75) Inventor: Alfred Edlinger, Baden (CH)

(73) Assignee: "Holderbank" Financiere Glarus AG, Glarus (CH)

( * ) Notice: Subject to any disclaimer, the term of this patent is extended or adjusted under 35 U.S.C. 154(b) by 0 days.

(21) Appl. No.: 09/485,369

(22) PCT Filed: Jun. 9, 1999

(86) PCT No.: PCT/AT99/00149

§ 371 Date: Feb. 9, 2000

§ 102(e) Date: Feb. 9, 2000

(87) PCT Pub. No.: WO99/64635

PCT Pub. Date: Dec. 16, 1999

(30) Foreign Application Priority Data

Jun. 10, 1998 (AT) .................................................... 1006/98

(51) Int. Cl.[7] .................................................... C21B 5/04
(52) U.S. Cl. ................ 75/567; 75/569; 420/29; 420/590
(58) Field of Search ................ 75/567, 569; 420/29, 420/590

(56) References Cited

U.S. PATENT DOCUMENTS 5,385,599 * 1/1995 Freissmuth ............................ 75/326

FOREIGN PATENT DOCUMENTS

| 36 12 6 13 | 11/1986 | (DE) . |
| 394 443 | 10/1990 | (EP) . |
| 666 930 B1 | 8/1995 | (EP) . |
| 59-104414 | 6/1984 | (JP) . |

OTHER PUBLICATIONS

Database WPI, Section Ch, Week 9107, Derwent Publications Ltd., London, GB; Class M24, AN 91–048918, XP002113541 & JP 03 002308 A (Nippon Kokan KK), Jan. 8, 1991.
Patent Abstracts of Japan, vol. 010, No. 085 (C–336), Apr. 4, 1986 & JP 60 218408 A (Sumitomo Kinzoku Kogyo KK), Nov. 1, 1985.
Database WPI, Section Ch, Week 7810, Derwent Publications Ltd., London, GB; Class L02, AN 78–18513A, XP002113542 & JP 53 008310 A (Nippon Steel Corp), Jan. 25, 1978.
Patent Abstracts of Japan, vol. 012, No. 223 (C–507) Jun. 24, 1988 & JP 63 018011 A (Kawasaki Steel Corp), Jan. 25, 1988.
Patent Abstract of Japan, vol. 008, No. 15 (C–206), Jan. 21, 1984 & JP 58 181815 A (Nippon Kokan KK), Oct. 24, 1983.

* cited by examiner

*Primary Examiner*—Melvyn Andrews
(74) *Attorney, Agent, or Firm*—Pillsbury Winthrop LLP

(57) ABSTRACT

In a method for desiliconizing pig iron prior to subsequent refining to steel molten steel slag after blast furnace tapping is charged onto the tapped pig iron bath, and optionally onto the blast furnace slag bath, in an amount corresponding to the Si content of the pig iron and the Fe and/or Cr oxide contents of the slag. The amount of steel slag is calculated such that the Si content of the pig iron is reduced to below 0.5% by weight at a simultaneous increase in the $SiO_2$ content of the slag while reducing to liquid metals the Fe and/or Cr oxides of the slag. The slag-iron bath temperature is maintained at below 1500° C.

13 Claims, 2 Drawing Sheets

METHOD FOR DESILICONIZING PIG IRON BEFORE REFINING IT TO STEEL

BACKGROUND OF THE INVENTION

1. Field of the Invention

The invention relates to a method for desiliconizing pig iron prior to subsequent refining to steel.

2. Description of the Related Art

Blast furnace pig iron, as a rule, contains approximately 0.4 to 2.8% silicon and more than 4% by weight carbon. In a refining procedure, silicon is oxidized to $SiO_2$ and carbon to carbon monoxide, wherein also an iron burn-up caused by the supply of oxygen can, of course, not be prevented in the course of the refining process. The slag forming during the refining of steel, as a rule, occurs as a strongly basic slag, since an accordingly high lime batch has to be charged, which is partially neutralized by the $SiO_2$ formed. The high basicity of such steel slags as well as the high portion of iron and chromium oxides as well as, optionally, heavy metal oxides do not readily allow for the direct use of steel slags for reasons of a potential toxicity. While blast furnace slag exhibits favorable hydraulic properties and a substantially reduced content of iron oxide and hence may more easily be supplied to an exploitation as a basic construction material, the disposal of steel works slags becomes more and more difficult, because such steel works slags in the composition as obtained, i.e., without subsequent metallurgical processing, are not readily usable for structural purposes or the like. The metallurgical processing of steel works slags usually involves a high energy consumption and high investment costs.

From EP 666 930 B1, a process has already become known, in which steel slag has been used for refining pig iron. In that known process, the high content of iron oxide of the molten steel slag is utilized for refining molten pig iron having relatively high carbon and silicon contents. Thereby, iron oxide reacts with carbon or iron carbide to form iron and carbon monoxide, whereas the iron oxide of the slag reacts with the silicon of the pig iron bath to form iron and $SiO_2$.

These reactions are relatively strongly exothermic, and with a long reaction time as in correspondence with the known proposal it is immediately feasible to recover crude steel, wherein the slag parameters may be optimized with a view to the subsequent use within the scope of hydraulically active binders by admixing additives such as $CaCO_3$, $Al_2O_3$ and/or $SiO_2$, particularly in separate converters.

When refining pig iron, in particular when refining highly silicon-containing pig iron, a quite considerable amount of $SiO_2$ is formed, which leads to an increase in the lime batch required for the refining process.

SUMMARY OF THE INVENTION

The invention aims to better utilize the heat balance of a reaction of pig iron with steel slag and, at the same time, provide a starting product for subsequent refining, with which the amount of slag for refining and, in particular, the lime batch can be reduced while simultaneously enhancing the iron output. To solve this object, the method according to the invention essentially consists in that molten steel slag after blast furnace tapping is charged onto the tapped pig iron, and optionally onto the blast furnace slag bath, in an amount corresponding to the Si content of the pig iron and the Fe and/or Cr oxide contents of the slag, which amount is calculated such that the Si content of the pig iron is reduced to below 0.5% by weight at a simultaneous increase in the $SiO_2$ content of the slag while reducing to liquid metals the Fe and/or Cr oxides of the slag, and that the slag-iron bath temperature is maintained at below 1500° C. Due to the fact that the steel slag charge is reduced, or adapted, in consideration of the specific analytical values and merely is effected to an extent that brings about a major decrease of the silicon content of the pig iron, it has become feasible to reduce the amount of silicon dioxide forming during the subsequent refining of steel and, hence, reliably keep the required basicity of the steel slags by the admixture of a reduced lime batch. By charging the steel slag directly onto the molten pig iron drawn off the blast furnace and optionally onto the blast furnace slag bath floating thereon, the blast furnace slag optionally entrained may be used for diluting and hence neutralizing the oxidative reaction process. The limitation to the refining of silicon without remarkably lowering the carbon content in the following allows for the conventional production of steel without any substantial modification except for a reduction of the lime batch. Simultaneously with the lowering of the silicon content, the iron and chromium oxide contents of the deposited steel slag may be reduced by way of an exothermic reaction, thus presenting an extremely advantageous overall heat balance. In such a reaction carried out, for instance, in a ladle, which may thus be realized at low investment costs, approximately 610 MJ/ton slag may be recovered in the form of heat during silicon refining. The thermal losses of a ladle occurring due to convection or radiation amount to about 160 MJ/ton slag, thus resulting in an overall heat surplus of about 450 MJ/ton slag. On account of this heat balance, it is, for instance, feasible to add to the pig iron, prior to its introduction into the refining converter, also additives such as, for instance, $Al_2O_3$ in solid form, which will subsequently substantially improve the composition of the slag for its use as a loading material for hydraulic binders. In order to heat 100 kg $Al_2O_3$ additive per ton of slag, about 200 MJ of heat are required, which may be completely covered by the above heat balance. The yet remaining surplus enthalpy may, for instance, be used to add scrap already in the mixer or in the ladle, in particular a torpedo ladle, or to do without an additional heating at a pig iron mixer. The adaptation of the charged amount of steel slag to the desired final value of the silicon content, thus, allows for a particularly economic mode of procedure, in which the subsequent steel production process will not be affected in any manner whatsoever, but rather enhanced due to the low amounts of $SiO_2$ during steel refining. The simultaneous mixing with optionally present blast furnace slag in the pig iron chute or pig iron mixer, or in a ladle, due to the dilution thereby obtained causes a reduction of the reaction speed and, hence, a reduction of the refining enthalpy, while nevertheless improving the quality of the slag already enhanced by the possibility of reducing iron and chromium oxides to liquid metals, and facilitating its disposal or further utilization.

An essential prerequisite for the economic feasibility of the method according to the invention is the fact that the slag-iron bath temperature is maintained at below 1500° C. Above that temperature, carbon tends to react with the iron oxide of the steel slag, because above that temperature carbon becomes less noble than silicon. It is only the limitation of the temperatures to 1500° C. that enables an economically expedient desiliconization, preventing the otherwise possible explosion-like eruptions of the slag-iron bath due to the spontaneous, uncontrollable formation of carbon monoxide. Thus, temperature control is of decisive importance to the realization of the method according to the invention, being accordingly feasible by the addition of scrap, the addition of cold slag, the removal of heat, the introduction of gas or the like, as will be explained in more detail below.

Advantageously, the method according to the invention is carried out in a manner that the Si content of the pig iron is reduced to below 0.2% by weight.

As already mentioned in the beginning, the method according to the invention may be carried out without great expenses in terms of plant technology, the method preferably being carried out such that the steel slag is charged into a pig iron mixer or ladle, in particular a torpedo ladle.

In order to ensure that the energy balance will remain positive and an accordingly high amount of liquid steel slag can be disposed of or further processed, it is advantageously proceeded in a manner that steel slag is charged in an amount smaller than ½, preferably smaller than ¼, of the amount of blast furnace slag. The limitation of the amount of steel slag, at the same time, also renders feasible to take into account the problem of refractoriness, the desired starting basicity of the slag being adjustable in that manner. It is, of course, also possible to include in this calculation the remaining amount of reduced slag rather than the amount of blast furnace slag.

As already mentioned in the beginning, the positive heat balance allows for the melting of additives such as, for instance, $Al_2O_3$ so as to be able to guarantee the optimum composition for the subsequent further use within the scope of the production of hydraulic binders. To this end, it is advantageously proceeded in a manner that additives such as, e.g., $Al_2O_3$ are charged together with the steel slag in amounts ranging from 50 to 180 kg/ton slag, the heat balance being sufficient for melting such amounts of $Al_2O_3$.

In order to be able to safely observe the desired parameters and, in particular, the desired reduction of the silicon content to predefined values, it is advantageously proceeded in a manner that the charging of the steel slag is effected via an adjustable or controllable charging means, which is adjusted or controlled as a function of the compositions of the steel slag and the blast furnace slag as well as of the composition of the pig iron bath. The reaction speed and the complete reaction even may be further enhanced in that inert gases, in particular nitrogen, are blown into the pig iron-slag mixture tapped from the blast furnace.

By blowing the inert gases advantageously into a pig iron bath chute onto which the steel slag or the slag mixture is being charged, the required temperature control to <1500° C. is reached at the same time. Temperature control to <1500° C., however, also may be effected by adding cold additives, cold slag and/or scrap.

Pig iron mixers in integrated iron and steel works serve as a pig iron intermediate storage between blast furnace and steel converter, the capacities of such pig iron mixers usually corresponding to at least one daily output of a steel works. The storage of such a daily steel works output in the pig iron mixer, at the same time, also is useful for the homogenization of the pig iron quality. Instead of pig iron mixers, mobile torpedo ladles are used as well, in which thorough mixing is enhanced by the automatic pivoting of the contents during transportation from the blast furnace to the steel works. In such torpedo ladles, the molten slag to be reduced advantageously is collected and the pig iron from the blast furnace is cast thereon, thus safeguarding a high turbulence and an intensive reaction.

The phosphorus eventually introduced into the pig iron bath through steel slags is slagged by the subsequent oxidizing refining procedure. Another option to interrupt the phosphorus cycle consists in dephosphorizing the pig iron bath under reducing conditions. This is effected by introducing calcium carbide or extremely fine quick lime. The highly phosphorus-containing intermediate slag may be converted into a high-quality fertilizer free of chromium by an oxidative after-treatment.

On the whole, a number of additives such as steel dusts and other silicate- and aluminate-containing metallurgical residual substances can now be melted directly along with the acidic additives such as $Al_2O_3$ as well as optionally additional $SiO_2$ on account of the extremely positive heat balance, thus enabling the substantial lowering of the basicity of the steel slag. As compared to conventional slag processes, $SiO_2$-containing additives, however, have to be added in substantially slighter amounts, since $SiO_2$ is immediately formed in the reaction of the steel slag with the pig iron bath. In this case, it is also advantageous that the pig iron is desulphurized at least partially by the CaO content of the slag.

The method according to the invention preferably may be carried out with a specially adapted device. Such a device for carrying out the method is essentially characterized by a chute for pig iron, on the bottom of which flushing bricks or passages for the introduction of inert gases are arranged and into which open a slag feeder as well as a blast furnace pig iron feeder, and a ladle for separating the slag bath from the iron bath, which ladle is arranged to follow said chute. Such a chute, onto which the desired cooling additives may be charged, serves to increase turbulences via said inert gases and, in particular, nitrogen under pressure so as to ensure better blending and, at the same, an enhanced thermal output. Feeding gases to the chute, thus, ensures that no local superheatings will occur and the temperature can be reliably kept at below 1500° C.

The device advantageously is further advanced to the effect that the chute opens into an immersed tube projecting into the iron bath of the ladle. Such an immersed tube projecting into the iron bath of the separating ladle serves to increase the reduction path of the ascending slag droplets so as to ensure complete reaction. Alternatively, intensive blending also may be reached in that the chute is designed as a cascade with the slag overflow of a consecutive cascade step being arranged below the plane of the iron bath supply from the preceding cascade step.

BRIEF DESCRIPTION OF THE DRAWINGS

In the following, the invention will be explained in more detail by way of an exemplary embodiment of the device for carrying out the method according to the invention, which is schematically illustrated in the drawing, as well as an exemplary embodiment. In the drawing.

DETAILED DESCRIPTION OF THE INVENTION

Figure 1:
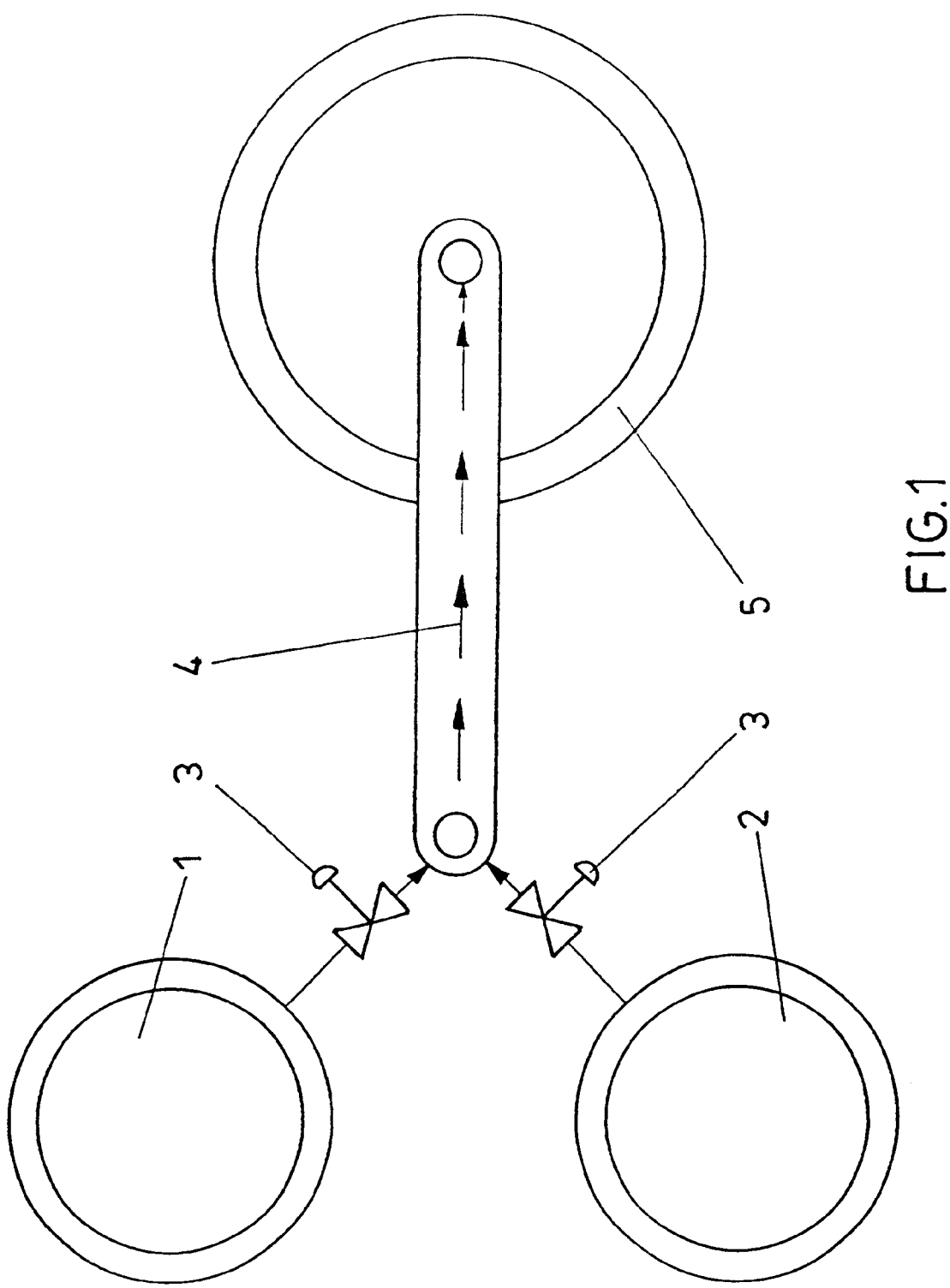
FIG. 1 is a top view on a device according to the invention for carrying out the method.

FIG. 1 schematically indicates a steel slag ladle at 1, a pig iron ladle being denoted by 2. The slag amounts drawn off the steel slag ladle, like the pig iron amounts, are charged onto a chute 4 via appropriately controlled throttling organs 3 and, after this, get into a separating ladle 5, in which the iron bath is separated from the slag.

Figure 2:
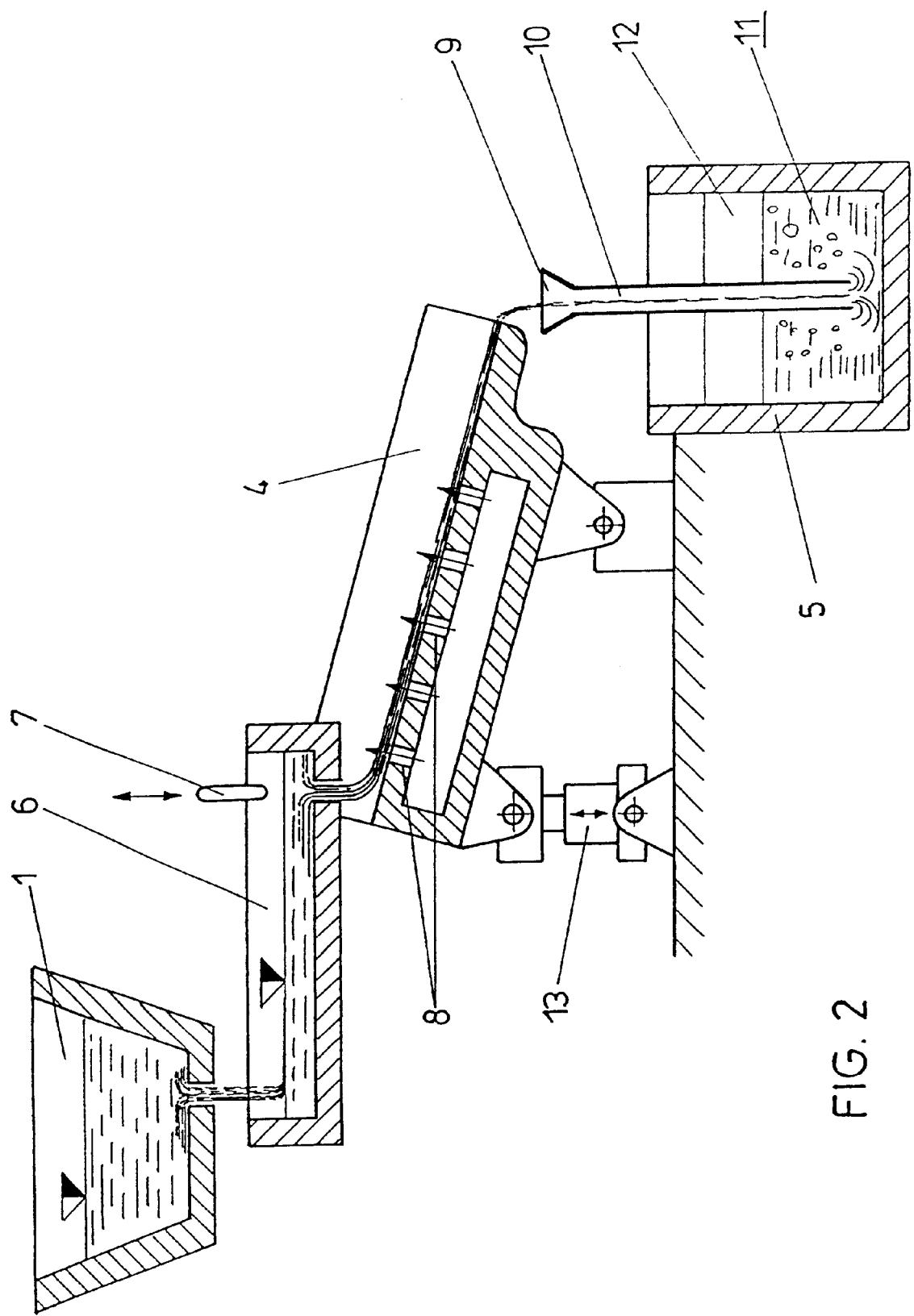
FIG. 2 is a schematic side view partially sectioned through parts of a device according to FIG. 1.

From the illustration according to FIG. 2, details of such a device are more clearly apparent. 1 again serves to denote the steel slag ladle to which a slag tundish 6 is connected, the slag feeder of which is denoted by 7. The steel slag gets onto the chute 4, wherein it is apparent from the illustration according to FIG. 2 that inert gas under pressure and, in particular, nitrogen is introduced via openings 8 provided in the bottom of the chute. As is schematically indicated in FIG. 1, the chute 4 is separately charged with pig iron optionally mixed with blast furnace slag.

The material largely desiliconized within the chute in the following reaches the funnel 9 of an immersed tube 10, which opens below the iron bath 11 present in the separating ladle 5. The ascending slag droplets are further reduced with a chromate-free slag 12 floating on the iron bath 11 in the separating ladle 5, which can be discharged separately.

The chute 4 may be adjusted in inclination by the aid of a suitable hydraulic means 13, it being feasible, in association with the compressed nitrogen provided for chute gassing, to adjust the flow speed and turbulence accordingly in order to achieve the optimum heat output so that the desired temperature limitation of the reaction will be safely observed. The temperature also may be maintained at below 1500° C. by means of a cooling air box arranged above the chute, which is not illustrated.

Exemplary Embodiment

A converter slag having the following composition was used:

| LDS | |
|---|---|
| Component | Portion (%) |
| $P_2O_5$ | 1.65 |
| CaO | 49 |
| $Al_2O_3$ | 0.81 |
| $SiO_2$ | 15.6 |
| MnO | 3.53 |
| FeO | 22.8 |
| MgO | 2.2 |
| $Cr_2O_3$ | 0.2 |
| $CaO/SiO_2$ | 3.14 |

The pig iron present in the pig iron mixer comprises 1% Si as well as 4.6% C. 150 kg confectioned converter slag are charged on 1 ton of pig iron. Confectioned means that the $CaO/SiO_2$ basicity has been lowered from 3.14 in the ladle and the $Al_2O_3$ content was raised to 10%.

Silicon Balance

Taking into consideration the above analysis, 1% Si in pig iron (10 kg Si per ton of pig iron) was set against the following slag components to be reduced:

$P_2O_5$: 16.5 kg/ton LDS

MnO: 35.3 kg/ton LDS

FeO: 228 kg/ton LDS $Cr_2O_3$: 2 kg/ton LDS 150 kg confectioned converter slag were charged onto the pig iron bath such that the following slag components were to be reduced per ton of pig iron.

$P_2O_5$: 1.98 kg/ton pig iron

MnO : 4.23 kg/ton pig iron

FeO : 27.36 kg/ton pig iron $Cr_2O_3$: 0.24 kg/ton pig iron

The Si of the pig iron then reduced the above-described slag components as follows:

$2\ P_2O_5 + 5\ Si \rightarrow 5\ SiO_2 + 4\ P$ $2\ MnO + Si \rightarrow SiO_2 + 2\ Mn$ $2\ FeO + Si \rightarrow SiO_2 + 2\ Fe$ $2\ Cr_2O_3 + 3\ Si \rightarrow 3\ SiO_2 + 4\ Cr$ Hence resulted the following silicon demand:

| | |
|---|---|
| $P_2O_5$ | 0.97 kg Si |
| MnO | 0.85 kg Si |
| FeO | 5.20 kg Si |
| $Cr_2O_3$ | 0.07 kg Si |
| Total: | 7.98 kg Si |

The pig iron in question contained 10 kg Si/ton pig iron (1% in pig iron) such that 2 kg Si/ton pig iron or 0.2% Si were present after the reaction. The slag reduction by means of silicon is exothermic such that no additional energy had to be supplied for this process.

By the slag reduction, $SiO_2$ was formed in the following amounts:

| | | |
|---|---|---|
| -> | from $P_2O_5$ reduction: | 2.1 kg $SiO_2$ |
| -> | from MnO reduction: | 1.8 kg $SiO_2$ |
| -> | from FeO reduction: | 11.5 kg $SiO_2$ |
| -> | from $Cr_2O_3$ reduction: | 0.14 kg $SiO_2$ |
| | Total: | 15.5 kg $SiO_2$ |

Hence resulted the following intermediate analysis of the slag:

| Component | Portion (%) |
|---|---|
| CaO | 70.8 |
| $Al_2O_3$ | 1.2 |
| $SiO_2$ | 25 |
| MgO | 3 |
| $CaO/SiO_2$ | 2.8 |

Such a slag intermediate analysis already exhibits a reduced slag basicity, further external $SiO_2$ correction may subsequently be effected by adding 250 kg $SiO_2$ per ton of slag so as to reach an $SiO_2$ content of 44% by weight and a value for the $CaO/SiO_2$ basicity of 1.6. The $Al_2O_3$ content of the slag was further increased to 10% by weight, which, however, was effected also in the pig iron mixer or in the torpedo ladle.

In doing so, the increase in the $Al_2O_3$ content in the first place served to enhance the early strength of hydraulic binders produced of such slags.

On the whole, the process control according to the invention calls for a small additional investment volume and practically no additional energy demand. Furthermore, $SiO_2$ addition is substantially reduced, since the basicity in the course of the process is sufficiently lowered by the $SiO_2$ formed by the refining of silicon.

What is claimed is:

1. A method for desiliconizing pig iron prior to subsequent refining to steel, comprising:

charging molten steel slag comprising iron oxide and chromium oxide onto a pig iron bath tapped from a blast furnace and containing Si, and optionally onto a blast furnace slag tapped from the blast furnace, to form a slag-iron bath and reacting the molten steel slag with the pig iron bath; and maintaining the slag-iron bath below 1500° C. in temperature, wherein the molten steel slag is charged onto the pig iron bath in an amount sufficient to decrease the Si content of the pig iron bath to below 0.5% by weight while simultaneously generating $SiO_2$ and to reduce the iron oxide and chromium oxide of the molten steel slag to liquid metals.

2. The method of claim 1, wherein sufficient molten steel slag is charged to decrease the Si content of the pig iron bath to below 0.2% by weight.

3. The method of claim 1, wherein said charging of the molten steel slag comprises charging the molten steel slag into a pig iron mixer or ladle.

4. The method of claim 3, wherein the ladle is a torpedo ladle.

5. The method of claim 1, wherein the molten steel slag charged onto the pig iron bath and blast furnace slag is less than ½ by amount of the blast furnace slag bath.

6. The method of claim 1, wherein the molten steel slag charged onto the pig iron bath and blast furnace slag is less than ¼ by amount of the blast furnace slag bath.

7. The method of claim 1, wherein said charging of the molten steel slag further comprises charging additives together with the molten steel slag, a ratio of kilograms of the additives to tons of the molten steel slag being in a range of from 50 kg/ton to 180 kg/ton.

8. The method of claim 7, wherein the additives comprise $Al_2O_3$.

9. The method of claim 1, wherein said charging of the molten steel slag is effected with an adjustable or controllable charging means, and wherein said method further comprises adjusting or controlling the means as a function of the compositions of the molten steel slag and the blast furnace slag.

10. The method of claim 1, further comprising blowing inert gas into a mixture of the pig iron bath and the blast furnace slag tapped from the blast furnace.

11. The method of claim 10, wherein the inert gas comprises nitrogen.

12. The method of claim 1, wherein said maintaining of the slag-iron bath below 1500° C. in temperature comprises charging the molten steel slag and optional the blast furnace slag onto a pig iron bath chute and blowing inert gases onto the pig iron bath chute.

13. The method of claim 1, wherein said maintaining of the slag-iron bath below 1500° C. in temperature comprises adding at least one member selected from the group consisting of cold additives, cold slag and scrap to the slag-iron bath.

* * * * *